United States Patent
Bird et al.

[15] 3,666,064
[45] May 30, 1972

[54] PERMANENT MAGNET SPEED RESPONSIVE CLUTCH

[72] Inventors: Waldo R. Bird; Wayne C. Shank, both of Williamsport, Pa.

[73] Assignee: Avco Corporation, Williamsport, Pa.

[22] Filed: Feb. 25, 1971

[21] Appl. No.: 118,685

[52] U.S. Cl.................192/84 PM, 192/46, 192/103 C, 60/39.24
[51] Int. Cl......................................F16d 27/01
[58] Field of Search.................192/84 PM, 53 D, 103 C

[56] References Cited

UNITED STATES PATENTS 3,283,588  11/1966  Merchant..................192/84 PM
3,603,437  9/1971  Spencer.....................192/84 PM Primary Examiner—Benjamin W. Wyche
Attorney—Charles M. Hogan and Gary M. Gron

[57] ABSTRACT

The disclosure illustrates a high speed clutch assembly incorporated in a differential gas turbine engine to prevent the turbine shaft from rotating at a speed greater than the compressor shaft speed. The clutch assembly comprises a pair of opposed clutch elements on the turbine shaft and compressor shaft, displaceable into engagement with one another. The clutch elements have magnets oriented so that as the rotational speed of the shafts become equal they are magnetically attracted into engagement. A magnetic spring biases the clutch elements away from one another so that they engage when the shaft speeds are substantially equal. In one form the magnetic spring comprises a pair of coaxial sleeve-type magnets positioned on the turbine shaft and compressor shaft to bias the clutch elements apart. In another form it comprises a bar magnet in the turbine shaft and a pair of bar magnets oriented with their longitudinal axis parallel to the axis of the shafts.

10 Claims, 2 Drawing Figures

Patented May 30, 1972
3,666,064
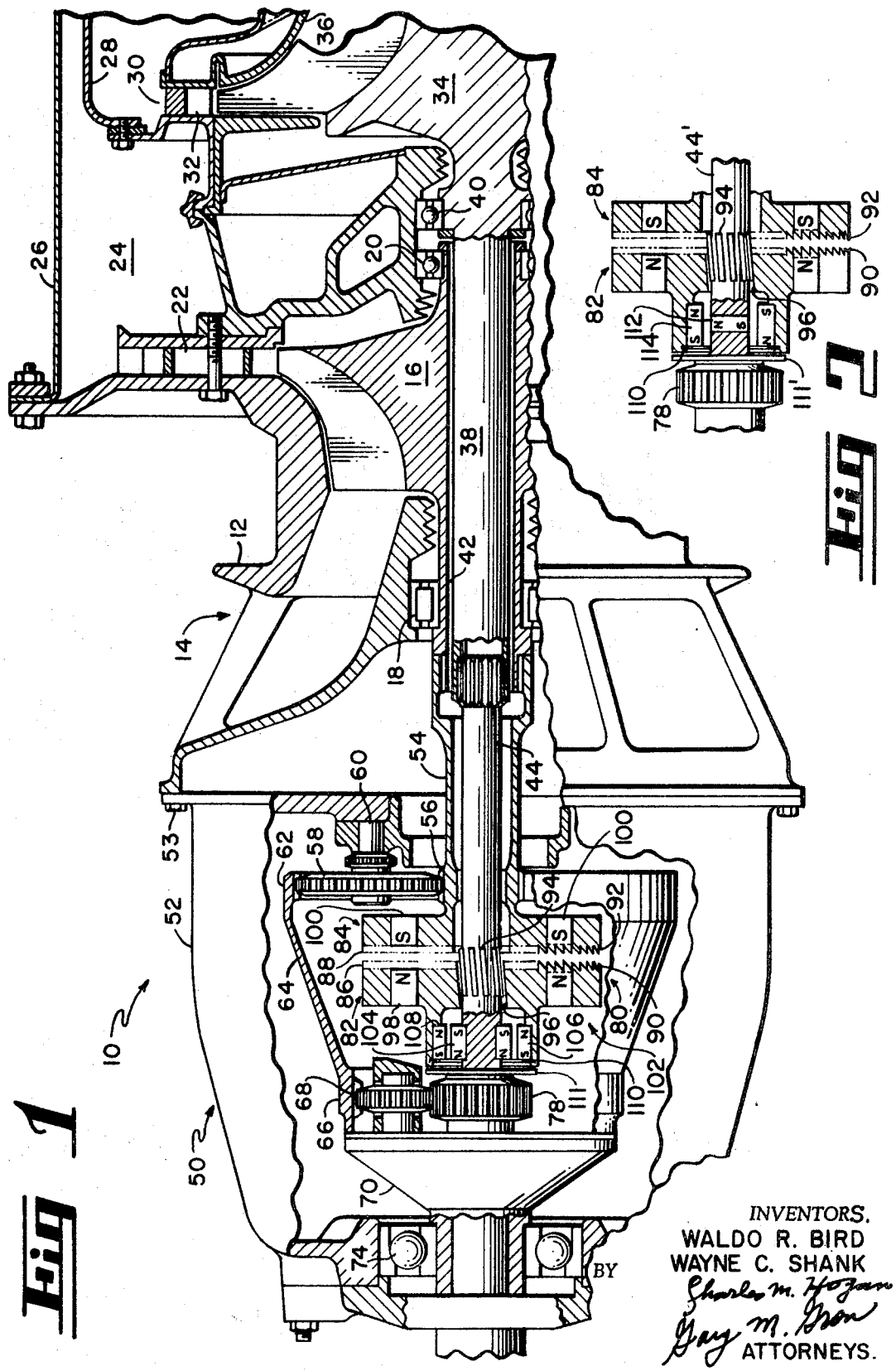
INVENTORS.
WALDO R. BIRD
WAYNE C. SHANK
BY
ATTORNEYS.

3,666,064

PERMANENT MAGNET SPEED RESPONSIVE CLUTCH

The present invention relates to clutch assemblies and more particularly to clutch assemblies adapted for use with high speed shafts.

In the past overrunning clutches have comprised springloaded wedge elements that couple an inner and an outer sleeve when the speed of the inner shaft exceeds the speed of the outer shaft. This has been a very effective form of a clutch for many purposes. However, for high speed applications, such as those found in gas turbine engines, the tremendous centrifugal force field renders action of the wedge elements ineffective.

To solve this problem it has been proposed to use an overrunning clutch that incorporates a pair of opposed clutch faces, each having a series of magnets embedded in them. The magnets are arranged at uniform intervals about the circumference of the clutch faces and adjacent magnets have opposite polarity. As the clutch faces rotate at differing speeds they are alternately attracted and repelled. As the rotational speed of the shafts approach one another the cycle decreases in frequency and the magnetic attraction becomes greater. When they finally approach the same level the faces line up so that magnets of opposite polarity on the opposed clutch faces attract one another to pull the faces into engagement. In the transition period just prior to equal rotation of speeds there tends to be a chattering between the clutch surfaces.

To alleviate the above problem the clutch surfaces have been biased away from one another with a coil spring. It has been found that in the high centrifugal force fields encountered in the gas turbine engine this spring tends to be deformed outward, thereby rendering it ineffective as a biasing force.

Therefore it is an object of the present invention to stabilize this type of clutch assembly for operation in high centrifugal force fields.

This end is achieved by providing a magnetic spring in a clutch assembly of the above type for biasing the clutch faces apart so that they engage one another only when their rotational speeds are substantially equal.

The above an other related objects and features of the present invention will be apparent from a reading of the description of the disclosure shown in the accompanying drawing and the novelty thereof pointed out in the appended claims.

In the drawing:

FIG. 1 is a longitudinal section view of a gas turbine engine incorporating an overrunning clutch that embodies the present invention; and FIG. 2 illustrates an alternate embodiment of the clutch assembly shown in FIG. 1.

Referring to FIG. 1 there is shown a gas turbine engine 10 in which the present invention may be utilized. The engine comprises a structural casing 12 forming the outer bounds of an inlet 14 for the entrance of air. A bladed centrifugal compressor rotor 16, journaled for rotation by bearings 18, 20 and having an integral shaft 42, pressurizes the air and accelerates it for discharge into a diffuser 22. The diffuser 22 discharges the air into a chamber 24 formed in part by an outer casing 26. The pressurized air passes aft to a combustor (not shown) where fuel is mixed with the pressurized air and ignited by suitable means to provide a hot gas stream. The gas stream is discharged through the outlet 30 of a turbine discharge duct 28 to a turbine inlet nozzle assembly 32. The turbine nozzle assembly directs the hot gases radially inward and in a tangential direction across the turbine blades of a centripetal turbine 34 to a suitable exhaust duct. The passing of the hot gases over the turbine 34 causes it to rotate and drive a shaft 38 which is journaled by bearing 40.

Shafts 38 and 42 extend forward to a differential gear box, generally indicated by reference character 50, and contained within housing 52. Housing 52 is secured to housing 12 by screws 53. Shaft 38 extends through shaft 42 and connects with an input shaft 44 having an integral sun gear 78 formed on it. Sun gear 78 meshes with a series of planetary gears 68 that are journaled on an output shaft assembly 70 journaled by a suitable bearing 74. Planetary gears 68 mesh with a ring gear 66 formed on the forward end of an annular casing 64. A second ring gear assembly 62 on the aft end of casing 64 meshes with a series of planetary gears 58 journaled in casing 52 by means of shafts 60. Planetary gears 58 also mesh with a gear 56 formed on a compressor drive shaft 54 which is suitable connected to compressor shaft 42.

The interconnection between the turbine rotor 34, compressor rotor 16 and the output shaft 70 constitutes a differential drive gas turbine engine. This type of engine is generally discussed in U.S. Pat. No. 2,693,080 in the name of David W. Hutchinson. There are conditions in this type of engine when the sudden dropping of a load on the output shaft could cause a rapid increase in the rotational speed of the centripetal turbine 34. To prevent this from occurring an overrunning clutch is incorporated between the turbine shaft 44 and the compressor shaft 54 to limit the turbine speed to a rate no greater than that for the compressor assembly. An example of such a clutch assembly may be found in U.S. Pat. No. 2,804,748, also in the name of David W. Hutchinson. With such an overrunning clutch there is a problem that occurs at high rotational speeds. The centrifugal force field causes the overrunning clutch elements to become ineffective. However, in accordance with the present invention an overrunning clutch, generally indicated by reference character 80, is incorporated between the compressor shaft 54 and the turbine shaft 44.

This assembly comprises first and second clutch elements 82 and 84 which are in the form of annular discs having clutch surfaces 86, 88, respectively. Clutch element 84 is secured to the compressor shaft 54. Element 82 is telescoped over shaft 44 and rotate with it. Ratchets 90, 92 are formed on these opposed surfaces so that when the surfaces 86, 88 abut one another the turbine shaft 44 cannot rotate faster than the compressor shaft 54. Element 82 is axially slidable for a limited extent by means of splines 94, 96 on the shaft 44 and the clutch element 82, respectively. As herein shown, the splines may be formed with a helix pattern so that as the turbine shaft 44 accelerates, the torque reaction of the helical splines 94, 96 forces the clutch element 82 in an aft direction into rapid engagement with clutch element 84.

A series of bar magnets 98 are formed in a uniformly spaced pattern around the circumference of disc 82. The magnets are arranges so that the polarity of one magnet is as shown in the illustration where its north pole is toward the clutch surface 86. The adjacent magnet, however, is oriented with its south pole toward the clutch surface 86. The same pattern is repeated around the circumference of the clutch element 82 so that if the surface 86 were to be viewed in an axial direction the magnets would present alternate north and south polarities around the periphery of the disc.

A plurality of bar magnets 100 are formed in the clutch element 84 around its circumference and in line with the elements 98 on clutch element 82. The magnets 100 are positioned with the same spacing as the magnets 98 and are oriented with the same alternate north/south relationship. It can be seen that as the elements 82, 84 rotate at differing speeds the magnetic elements 98, 100 are alternately attracted and repelled as they pass adjacent magnets with opposing and like polarity. When the speeds are greatly different the attraction and repulsion tends to cancel out. However, when the speeds approach one another the attracting force becomes greater and greater. During the transition period the magnets tend to cause a chattering action which prevents a clean engagement of the ratchets 90 and 92.

To maintain the ratchets out of engagement until the speeds are substantially equal, a magnetic spring, generally indicated by reference character 102, is provided to bias clutch element 82 away from element 84.

In one form the magnetic spring 102 comprises inner and outer magnetic rings 104 and 106, respectively. Element 104 is telescoped over and retained on shaft 44 while magnet 106 is retained against a shoulder 108 on element 82 by a suitable retaining ring 110. A flange 111 on shaft 44 limits the displacement of clutch element 82 away from element 84. The magnets 104, 106 are orinted so that element 104 has its north pole toward the forward end of the engine and element 106 has its south pole toward the forward end of the engine. This causes the sleeves to assume the forward end of the engine. This causes the sleeves 104, 106 to assume a neutral position where they have their north and south poles substantially in line. This neutral position is selected so that clutch element 82 is displaced from element 84.

In operation as the speed of the elements 82, 84 approach one another, magnetic elements 98 and 100 tend to exert an ever increasing magnetic force tending to pull elements 82, 84 together. However, since this displaces magnets 104, 106 out of alignment, it causes a magnetic restoring force that tends to hold elements 82, 84 out of engagement. For sleeve magnets of this type relative displacement produces a restoring force that follows a sinusoidal path with the peak force exerted when one end of the inner sleeve is approximately midway between the ends of the outer sleeve. Thus, the sleeves act as the equivalent of a spring. The magnetic strength and required range of travel are selected so that the biasing force is sufficient to maintain the clutch elements 82, 84 out of engagement except when they are at substantially the same speed.

As the rotational speed of the turbine shaft 44 becomes lower than the speed of the compressor shaft 54, the ratchets permit clutch element 82 to rotate relative to element 84. When this happens they are alternately repelled and attracted so that the attracting force decreases as the difference in rotational speeds increase. At this time the magnetic spring 102 asserts a sufficient force to pull the clutch elements 82, 84 completely out of engagement.

FIG. 2 illustrates an alternate embodiment of the magnetic spring 102 shown in FIG. 1. In this figure a magnetic spring 102' comprises a bar-type magnet 112 fixed on shaft 44' and positioned so that its longitudinal axis is normal to the axis of rotation of shaft 44. A pair of bar magnets 114 are suitably retained in clutch element 82, 180° apart, and have opposite polarities. Thus, as shown in FIG. 2, the magnet 114 at the top of the FIG. 1 has its south pole positioned toward the forward end of the engine and the magnet 114 toward the bottom of the figure has its north pole oriented to the front of the engine. Therefore the north pole of magnet 112 is attracted toward the south pole of the upper magnet 114 and the south pole of magnet 112 is attracted toward the north pole of the lower magnet 114. The flange 111' limits the forward displacement of the magnets 114 and clutch element 82. The axial travel of the clutch element 82 along the helical splines 94, 96 is sufficiently small so that the magnet 112 is always within the magnetic influence of magnets 114. It can be seen that since magnet 112 is approximately midway between magnets 114 at their forward position, the magnetic force tending to hold the elements 82, 84 apart is near the maximum on the sinusoidal curves of restoring force. The total displacement of the magnets 114 relative to magnets 112 is relatively small so that the restoring force remains substantially constant.

The magnetic elements 112 and 114 function in a manner similar to that for the magnetic spring 102 in that they maintain the clutch elements 82 and 84 out of engagement until their rotational speeds are substantially the same.

The above clutch arrangements function effectively in the high centrifugal force field associated with high R.P.M.s because there are no parts that are magnetically deformed to produce the spring rates. The magnets can be made as rigid as necessary to withstand the centrifugal force and the magnetic attraction or propulsion is completely independent of the speed at which the magnets rotate.

While the above clutch assemblies have been shown in connection with a gas turbine engine, it is apparent to those skilled in the art that it can be used for other applications without departing from its spirit and scope.

Having described the invention, what is claimed as novel and desired to be secured by Letters Patent of the United States is:

1. A clutch assembly comprising:
   first and second rotatable clutch elements having opposed axially facing clutch surfaces said elements being axially displaceable toward one another into engagement;
   a plurality of magnets positioned in the clutch surfaces and having their polarities arranged so that as the elements approach the same rotational rate they are magnetically attracted to engage the clutch surfaces; and
   a magnetic spring comprising a magnetic element on said first clutch element and a second magnetic element axially fixed relative to the second clutch element, the polarity of said magnetic elements being arranged so that the clutch elements are biased away from one another with sufficient magnetic force to permit engagement of the clutch surfaces only when the R.P.M. of the elements is substantially equal.

2. A clutch assembly as in claim 1 wherein said magnetic spring comprises first and second magnetic sleeves, one telescoped within the other, one of said elements being fixed on said first clutch element and the other axially fixed relative to the second clutch element, said magnetic sleeves having a magnetic polarity which positions said magnets in a neutral position relative to one another, said neutral position being selected so that the clutch surfaces are maintained away from one another.

3. A clutch assembly as in claim 2 in combination with a pair of coaxial shafts wherein:
   said second clutch element is secured to the outer of said coaxial shafts;
   the first clutch element is fixed to the inner of said coaxial shafts;
   said inner magnetic sleeve of said magnetic spring is secured to said inner shaft; and
   said clutch assembly further comprises a spline assembly between said first clutch element and said inner shaft whereby the first clutch element is rotatable with but axially displaceable relative to said first shaft.

4. A clutch assembly as in claim 3 wherein said splines are formed in a helical relationship so that as the inner shaft accelerates toward the speed equal to that of the outer shaft the torque reaction on the helically directed splines urges the first clutch element into engagement with the second clutch element.

5. A clutch assembly as in claim 4 wherein said first and second clutch surfaces have a plurality of ratchets formed around their circumference so that when the clutch surfaces are engaged the inner shaft cannot rotate faster than the outer shaft.

6. Apparatus as in claim 5 wherein said inner shaft is a gas turbine engine turbine shaft and the outer shaft is a compressor shaft, both shafts being connected to a differential gear box and wherein said turbine shaft is limited to a rotational speed no greater than the speed of the compressor shaft.

7. A clutch assembly as in claim 1 wherein said magnetic spring comprises:
   a pair of bar-shaped magnetic elements on said first clutch element, said magnetic elements being positioned 180° apart and having oppositely directed poles;
   a bar-shaped magnetic element having its longitudinal axis normal to the axis of rotation of said first clutch element and rotatable therewith, said bar element having opposite polarity at its ends and positioned so that the pair of magnetic elements are in line with its poles and the first clutch element is urged away from the second clutch element.

8. A clutch assembly as in claim 7 wherein said magnets on said first clutch element are positioned with their midpoint approximately in line with the magnetic element and the relative displacement sufficiently small so that the magnetic force is substantially constant.

9. The clutch assembly as in claim 8 for use with first and second coaxial shafts and wherein:

said first clutch assembly is rotatable with and axially displaceable relative to said inner shaft;
said second clutch element is fixed on said outer shaft; and
said magnetic element is secured to said inner shaft.

10. A clutch assembly as in claim 9 further comprising:
helical splines on said first clutch element and said inner shaft; and
a plurality of ratchets formed around the circumference of said clutch faces and positioned so that said inner shaft is limited to a rotatable speed no greater than the rotational speed of said outer shaft.

* * * * *